United States Patent [11] 3,622,344

[72] Inventor Robert P. Allingham
 Groton, Conn.
[21] Appl. No. 812,863
[22] Filed Apr. 2, 1969
[45] Patented Nov. 23, 1971
[73] Assignee Pfizer Inc.
 New York, N.Y.

[54] SOPHOROSIDE ESTERS IN PREPARED FOOD PRODUCTS
11 Claims, No Drawings

[52] U.S. Cl..................................................... 99/80 R,
 99/23, 99/83, 99/85, 99/86, 99/91, 99/92, 99/100 P, 99/118 R, 99/118 P, 99/122 R, 99/128, 99/134 A, 99/136, 99/139, 99/144
[51] Int. Cl...................................................... A21d 2/16, A23l 1/00, A23l 1/24

[50] Field of Search............................................ 99/1, 80 R, 90 R, 86, 92, 136, 91, 144, 118 R, 85, 83, 23, 100 P, 118 P, 122 R, 128, 134 A, 139

[56] References Cited
UNITED STATES PATENTS
3,343,964 9/1967 Thomas......................... 99/80 R
3,442,659 5/1969 Baeuerlen et al............. 99/91

Primary Examiner—Raymond N. Jones
Assistant Examiner—James R. Hoffman
Attorney—Connolly and Hutz ABSTRACT: Sophoroside alkyl esters of certain $C_{16}$ to $C_{18}$ monohydroxy fatty acids, wherein the alkyl groups contain from two to about 18 carbons, show highly desirable effects in improving the properties and general eating characteristics of starch-based and animal or vegetable fat emulsion-based food products at levels between about 0.01 and about 3 percent by weight on an as consumed basis.

SOPHOROSIDE ESTERS IN PREPARED FOOD PRODUCTS

BACKGROUND OF THE INVENTION

Changes in food handling and food processing have been occurring with increasing regularity during the past few decades. Prepared foods are now manufactured on larger and larger scales and, with increasing frequency, on a continuous basis as well. The mass distribution of preprepared food products is still continually increasing. This trend has required new techniques to insure consistency, safety, high quality, stability, improved handling characteristics and palatability, etc., in preprepared foods. Important agents for these purposes include food additives sometimes referred to as "surfactants" or as food emulsifiers. For example, by forming apparent chemical complexes with starch molecules, the above agents can improve the general quality of starch-based foods such as bread, cake, pastries, puddings, pasta products, cereals, prepared rice products, prepared potato products, etc., while through fat emulsification and the stabilization of fat emulsions, the general quality of such foods as salad dressings, ice cream, chocolate products, peanut butter, margarine and milklike drinks, etc., are also improved. In those cases of starchy foods which also contain emulsified fat, like emulsified shortenings, both starch complexing and fat emulsification are found to be equally possible in the same food, examples of which include pastries, donuts, cake, and so on. As used above, the term "general quality" includes such characteristics as texture, volume, viscosity, stability, mouth-feel as well as general overall eating characteristics.

Agents currently used for food emulsification or "surfactant" purposes are derived from both natural and synthetic sources. Among the more commonly used agents today for these purposes are the monoglycerol esters of the higher fatty acids derived from food fats, including the glycerides of palmitic, stearic and oleic acids, etc., which are, in turn, readily obtained, usually as mixtures, from either animal or vegetable sources (i.e., as fats or oils). Other currently used agents include sodium stearyl fumarate, calcium stearyl-2-lactylate, and many other compounds as well. However, all agents have some disadvantages in that they may be limited in their range of activity, frequently require large amounts of additives, occasionally exhibit some incompatibilities with other additives, may require special operating conditions for use, etc. For example, in the large-scale continuous bread-making process, there has been a constant search for new, more convenient and more efficient additives which will improve the strength and processability of the dough itself and the volume, grain, softness, etc., of the final bread product. The present invention now provides a new class of agents that show unusually high activity as food emulsifiers or as surfactants in a wide variety of starch-based or oil emulsion-based food products as hereinbefore mentioned and exemplified. This present class of surfactants comprises the sophoroside alkyl esters of certain $C_{16}$ to $C_{18}$ monohydroxy fatty acids, wherein the alkyl groups contain from two to about 18 carbons. Outstanding results are also obtained when the compounds of this invention are used as additives in leavened baked goods for both antistaling and dough-conditioning purposes.

The class of sophoroside esters used in the food emulsification and baked goods improvement methods and products of this invention is generally known, but many of the specific members of the class, especially those with higher alkyl moieties, have apparently not been prepared previously. Certainly the use of this entire class of compounds as food emulsifiers and baked goods additives has not been hitherto known in the art, and it is that use which forms a major part of the present invention.

The sophorosides have the following general structure:

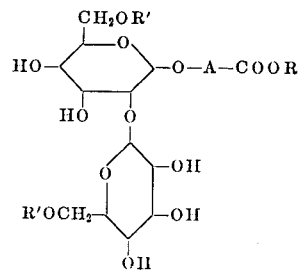

where A represents a saturated or unsaturated (primarily one to two double bonds) hydrocarbon chain joined at the terminal carbon or at the carbon adjacent thereto to the sophorose portion of the molecule through the ether linkage shown. Such products in free acid form and having the sophorose moiety partially acetylated (R is hydrogen and R' is acetyl) may be obtained by fermentation. The fermentation products can then be deacetylated (R=R'=hydrogen). Neither the free acid forms nor the deacetylated derivatives (the sophorosides per se) are used as such. However, when the sophoroside intermediates are esterified (R is alkyl and R' is hydrogen) useful surfactant or emulsifying properties are obtained. Some of such esters are disclosed in U.S. Pat. Nos. 3,312,684 and 3,205,150, but only as intermediates. These patentees take the compounds one step further, to cleave the sophorose from the hydroxy fatty acid moieties and then use the final hydroxy fatty acids as lubricants, perfume and plastic components, surfactants, etc.

The initial fermentation products as well as the later deacetylated products, including the sophoroside esters of this invention are not pure substances, but rather mixtures which vary in the fatty acid portion of the molecule. When various precursors or substrates are supplied to the fermentation in order to enhance the yield of sophorosides, these additives also effect the composition of the products. Such precursors include hydrocarbons, fatty acids, or fatty acid glycerides as contained in animal fats or vegetable oils. Thus, when "white grease" (industrial-grade lard) is supplied to the fermentation, the products are largely sophorosides of $C_{18}$ saturated and unsaturated fatty acids. If the white grease is prehydrogenated to eliminate unsaturation, the resulting sophoroside products are likewise predominantly saturated, although some sophorosides of unsaturated fatty acids are still formed in the fermentation. Where palmitic acid is supplied to the fermentation, the products contain a high proportion of sophorosides of hydroxy palmitic acid ($C_{16}$). In all such fatty acids, the single hydroxy group is either on the omega carbon or the carbon adjacent thereto.

SUMMARY OF THE INVENTION

It is among the objects of this invention to provide for the first time a number of sophoroside esters of the above-described class and to describe their use in starch-based and fat emulsion-based food products. A particular object is to use such novel esters, and generally all those alkyl esters wherein the alkyl group is from $C_2$ to about $C_{18}$, as additives in the preparation of leavened baked goods.

These objects are realized by the present invention which, in its broader aspects, comprises incorporating into the food product at an appropriate stage of manufacture, an effective small proportion, generally from about 0.01 to about 3 percent by weight, on an as-consumed basis, of at least one sophoroside of an alkyl ester of a substantially $C_{16}$ to $C_{18}$ fatty acid having a single hydroxy group on its terminal carbon or on the carbon adjacent thereto, said alkyl substituent containing from two to about 18 carbon atoms. The sophorosides may be used as dry solids, as aqueous solutions or suspensions or as oil emulsions or whatever physical form is most convenient. Depending on such form, they may be mixed first with any normal raw material such as flour or other solid ingredient, with shortening, or with water, milk or other liquid ingredient used in the manufacture or processing of a particular product. Alternatively, they may simply be uniformly incorporated into the dry or liquid-formulated product. Experimentation will easily reveal to those skilled in the art the more convenient process for each case.

The effective use level for the sophoroside products of this invention varies considerably with the nature of the specific food product in which they are intended to be used, although the general level is from about 0.01 percent to about 3 percent by weight, as previously indicated. Further, these use levels are influenced not only by the nature of the ingredients, but also by economic considerations as well. For example, in continuous bread baking, desirable use levels are approximately 0.1 to 0.5 percent, based on final product weight, although effective results are also obtained over a considerably wider range. On the other hand, in salad dressings or in ice cream, considerably lower use levels are indicated, e.g., 0.01 to 0.2 percent. Simple experimentation by the user will readily establish an effective concentration level within the aforesaid range for each specific product.

The final food products obtained through incorporating the sophoroside esters of this invention by the herein described method are notable for their improved physical properties such as texture, volume, mouth-feel, stability, viscosity and general eating characteristics. The treated products are also characterized by improved processability in their manufacture. Thus, ultimate baked goods obtained by using this method are notable for their softness, pleasing grain and texture as well as increased resistance to staling, while the raw doughs treated with the sophoroside esters are characterized by improved strength and processability, rapid expansion during baking and desirable handling properties in general. Furthermore, oil emulsion foods such as salad dressings, ice cream, whipped toppings, chocolate products, etc., are characterized by a smoother texture, increased emulsion stability, desirable viscosity characteristics, etc. On the other hand, cereal products, rice products, puddings, pasta products, potato products, and so on, are characterized by reduced tendency towards stickiness, a smoother consistency, improved mouth-feel and a reduced tendency to form undesirable surface films, etc.

DETAILED DESCRIPTION OF THE INVENTION

As previously indicated, only minor proportionate amounts of the sophoroside esters need be used in the aforementioned food products in order to achieve effective results. For instance, concentrations as low as 0.01 percent by weight of the compound, based on the weight of the final product, have been found to be effective in certain cases and, in general, one need only employ these compounds at levels that are in the range of from about 0.01 percent up to about 3.0 percent by weight of the final food product in order for highly satisfactory results to be achieved. Moreover, the sophoroside esters of this invention accomplish their useful physical characteristic improvements in food without causing any adverse side effects to occur. For instance, they do not adversely affect and indeed, may even enhance the crumb size, grain, crust, color, texture, specific volume and flavor of the finished bakery products when the latter are baked under normal, standard conditions. The bread-softening activity of these compounds is also surprising when one considers that the corresponding methyl ester lacks this activity to a substantial degree.

Additionally, the compounds of this invention impart improved qualities, in general, including antistaling properties, to such baked products as rolls, doughnuts, biscuits, cakes, pastries and the like, as well as bread, when added to the dough in the quantities previously indicated. For instance, among the specific advantages which have been realized by their use in this manner with respect to the yeast-leavened products are: (1) Retardation of crumb firming; (2) improved dough-handling characteristics; (3) improved ingredient and processing tolerances; (4) reduction in proof time; and (5) improved physical characteristics, such as the grain, texture and volume of the finished baked goods. Furthermore, chemically leavened baked goods also benefit by the use of these compounds in the dough or batter prior to baking in the same manner as before. Thus, for example, improved batter and/or dough-handling characteristics have resulted, as well as improved finished goods properties, together with firmness and crumb quality, etc.

The sophorosides may be incorporated in the premixed dough just before backing, or in one or more of the dough components prior to mixing. For instance, some of the sophorosides are obtained as fluffy solids. These may be readily admixed with the flour, powdered eggs or milk solids, or suspended in the aqueous component of the dough (e.g., water or milk) and thus, incorporated ultimately in the dough. One particularly preferred embodiment of the invention lies in the preparation and use in doughs of a shortening composition comprising a major proportion of a conventional shortening for leavened doughs or batters (e.g., lard, vegetable shortenings, oils, etc.), together with a minor proportion of one or more of the useful sophorosides. Such compositions may contain any desired proportion of the sophorosides up to say 50 percent, depending, of course, on the overall amount of the composition to be eventually incorporated in the dough, i.e., the total amount of shortening and total amount of sophoroside desired in the final product. Generally most effective, at most reasonable cost, are shortening compositions wherein the sophoroside content ranges from about one-tenth to one-third by weight of the shortening itself.

The following examples are given simply to illustrate this invention, but not in any way to limit its scope.

PREPARATION A: SOPHOROSIDE OF ETHYL PALMITATE

A crude sophoroside oil made from fermentation of methyl palmitate is dried by extracting same with ethyl acetate, treating the ethyl acetate extracts with a chemical drying agent (e.g., anhydrous $MgSO_4$) and evaporating the dried solution in a vacuum. A 90-gram portion of the resulting dry crude sophoroside is then dissolved in anhydrous ethanol (denatured 2B, 900 ml.), and the solution is heated under reflux while an ethanol solution of enough sodium ethoxide (0.5 N, ca. 300 ml.) is added so that the resulting mixture is strongly alkaline. After boiling for an additional 30 minutes, the solution is cooled to room temperature. A thin-layer chromatogram of the mixture at this point (Brinkmann No. 68-10-01, silica gel plates developed by ascending with $CHCl_3$, 80 parts; MeOH, 20 parts; HOAc, 1-5 parts; then developed with phosphomolybdic acid spray) shows that the original complex mixture of substances, having Rf values from about 0.1 to 1.0, has been converted to a relatively simple mixture with no detectable amount of component having an Rf value greater than about 0.4. A solution of sufficient HCl in dry ethanol (2 N, ca. 440 ml.) is then added so that the base present in the mixture is neutralized and sufficient additional acid is made available to provide a final hydrogen ion concentration of about 0.4 N. The resulting mixture is then stirred at room temperature for 30 minutes, at which time thin-layer chromatography (as described above) indicates that esterification is essentially complete. The acid catalyst is neutralized with excess $NaHCO_3$ (final pH of about 5), the excess $NaHCO_3$ removed by filtration, and the filtrate subsequently evaporated to dryness in vacuo. The residual crude product is then dissolved in ca. 300 ml. of water and the solution extracted with water-saturated n-butanol. The butanol layer is thereafter evaporated in vacuo until all the butanol is removed (distillation of some water is also required in order to accomplish this step). Enough water is then added to the residue to make a solution containing about 20 percent solids, and the resulting solution is freeze-dried. The cream-colored, fluffy solid product weighs 62.5 g. (about 75–80 percent of theoretical) and has the following analyses:

| | |
|---|---|
| 1. —COOH content (direct titration) | 0.04 meq./g. |
| 2. Saponification | 1.67 meq./g. |
| 3. —COOR content (2–1), found | 1.63 meq./g. |
| —COOR content, calculated | 1.605 meq./g. |
| 4. % acetyl | 0.43% |

The corresponding sophorosides of both n-propyl and isopropyl palmitate are prepared in the same way.

PREPARATION B: SOPHOROSIDE OF N-BUTYL ESTER OF WHITE GREASE

A crude sophoroside oil made from fermentation of commercial white grease is purified by washing same with two equal volumes of water. A 100-gram sample of the washed oil is then mixed with 100 g. of n-butanol, and the mixture heated under reflux in a nitrogen atmosphere at a pressure equivalent to about 60 Torr. Water is removed from the vapor phase by means of a Dean-Stark trap. The final water concentration in the solution is 0.11 percent. A solution of KOH in n-butanol (0.5 N, 100 ml.) is then added and the mixture heated at 75° C. for 15 minutes. At this point, thin-layer chromatography by the technique of the previous preparation indicates ester interchange to be essentially complete. After another 25 minutes at 75° C., the mixture is cooled to 15° C. and dry HCl gas (0.1 g., 250 meq.) is added with stirring. The final hydrogen ion concentration is about 0.4 N. The mixture (Heterogeneous) is stirred at ambient temperature for 1.5 hours, at which time thin-layer chromatography shows the esterification to be substantially complete. The acid catalyst is then neutralized with water and excess NaHCO₃, solids are removed by filtration, the aqueous phase is extracted with n-butanol. The combined butanol extracts are subsequently evaporated in vacuo until all the butanol is removed, and the concentration of the aqueous residue is then adjusted to about 50 percent by evaporation of some water. Evaporation to dryness of an aliquot shows the solids content of the solution to be 45 percent. The —COOH content of this product is 0.05 meq./g. by direct titration.

In another similar preparation, the product is isolated by evaporating the butanol solution, dissolving the residue in water and freeze-drying the resultant aqueous water solution. The tan-colored fluffy product, obtained in nearly quantitative yield, gives the following analyses:

| | |
|---|---|
| 1. —COOH content (direct titration) | 0.06 meq./g. |
| 2. Saponification | 1.57 meq./g. |
| 3. —COOR content (2–1), found | 1.5 meq./g. |
| —COOR content, calculated | 1.47 meq./g. |
| 4. % acetyl | 0.51% |

The corresponding isobutyl easter sophoroside is similarly prepared.

PREPARATION C: SOPHOROSIDE N-HEXYL ESTER

Method I

A sample of the sophoroside methyl ester from a methyl palmitate fermentation (i.e., so-called "deacetylated" sophoroside methyl ester), weighing 12.2 g., is mixed with n-hexanol (75 ml.) and 40 ml. of a 0.5 N solution of sodium n-hexyloxide in hexanol. The mixture is stirred and heated in a vacuum such that the hexanol solvent distills slowly at an equilibrium vapor temperature in the range of 60°–80° C. Air is excluded from the system, and any exit gases are led through a dry-ice trap. The hexanol is allowed to distill slowly over a period of about 3 hours, and the distillate and contents of the dry-ice trap are analyzed periodically for methanol content by GLC (gas-liquid chromatography, column 15 percent Carbowax 20M, 5 ft.×⅛ inch; $T=120°$ C., Varian-Aerograph model 1525—B, flame ionization detector). After about 3 hours, the yield of methanol indicates the reaction is essentially complete. The remaining hexanol is then evaporated in vacuo, and the residue is dissolved in a butanol-water mixture and acidified with mineral acid. The water phase is extracted with butanol and the butanol extracts are subsequently combined, dried and evaporated. The solid residue is then dissolved in water (10 percent conc.) and freeze-dried. The light-colored, fluffy product weighs 11–12 g. and represents an 81–88 percent yield.

Method II

A sample of dried crude sophoroside*

*The crude sophoroside as obtained from the fermentation contains water, which can be removed by any appropriate means such as evaporation in vacuo or partial evaporation, dissolving in an organic solvent such as ethyl acetate, drying the organic solvent solution with a chemical drying agent, such as anhydrous magnesium sulfate, and finally evaporating the organic solvent solution to dryness. Other means such as azeotropic distillation or molecular sieves can also be used. from fermentation of commercial "white grease," weighting about 50 g., is dissolved in 300 ml. of hexanol and the solution is heated to 75° C. A solution of sodium n-hexyloxide in hexanol (0.5 N, 150 ml.) is added and the mixture is stirred at 70°–75° C., in a nitrogen atmosphere. During this time, the mixture is analyzed periodically by thin-layer chromatography (TLC). After about 1 hour, TLC shows that the reaction is complete. After acidification (to ca. pH 3) with aqueous mineral acid, the resulting hexanol layer is then washed with water and subsequently evaporated in vacuo. The residue obtained in this manner is dissolved in water and freeze-dried. The light-colored fluffy product weighs approximately 35 g. (yield about 75 percent). It consists of approximately 70 percent ester and 30 percent free acid, as shown by titration and saponification data. This corresponds to the proportion of free acid present in the crude sophoroside starting material.

PREPARATION D: SOPHOROSIDE N-OCTYL ESTER

The methods used for the preparation of the n-hexyl ester are also applied to the preparation of the corresponding octyl ester. Substantially the same results are also obtained as to both yield and purity of product.

PREPARATION E: SOPHOROSIDE MIXED ESTERS

Method I

A commercially available straight-chain alcohol mixture with the approximate composition of tetradecyl–1 percent, hexadecyl–35 percent, octadecyl–62 percent and other–2 percent, and with a melting point of about 45° C., is used to form sophoroside ester in a manner analogous to the preparation of the hexyl ester set forth above. Sodium metal (23 g., 1.0 mole) is dissolved in the alcohol (1,000 ml.) by heating and stirring in an inert atmosphere at about 120° C. for about 24 hours. A suspension of the methyl ester of "deacetylated" sophoroside from a methyl palmitate fermentation is then prepared by stirring and heating 610 g. (1 mole) of the finely divided ester with 1,000 ml. of the mixed alcohol. This mixture is added to the partly cooled (90°–100° C.) alkoxide solution, and the resulting mixture is stirred and heated at 100° C. in a moderate vacuum (about 15 Torr.) while all exit gases are led out through a dry-ice trap. When the amount of entrapped methanol (as determined by periodic GLC analysis of the trap contents) indicates that the reaction has progressed to the desired extent, the heating is discontinued and the alkaline catalyst is neutralized with carbon dioxide or with acetic acid. The liquid reaction mixture is then poured slowly into thin layers and allowed to freeze. The crude product thus obtained contains the desired mixed esters of the starting alcohols as a suspension in the same alcohols, with a sophoroside content of about 20 percent. This is a suitable form of the product for many applications. However, the sophoroside ester can also be obtained free from the salts and unreacted alcohol, if so desired, by any suitable means, such as column chromatography on silica gel, etc.

Method II

A commercially available straight-chain natural fat-derived alcohol mixture with the approximate composition of tetradecyl–1.0 percent, hexadecyl–28.0 percent, octadecyl–67 percent and a melting point of about 63° C., is used to form the sophoroside ester from dry crude sophoroside by a method similar to that described above for the n-hexyl ester. Sodium metal (2.30 g., 0.10 mole) is dissolved in 100 ml. of the alcohol mixture by heating and stirring in an inert atmosphere at about 120° C. for about 24 hours. A sample of dried crude sophoroside from fermentation of commercial edible tallow, weighing approximately 65 g., is then mixed in a separate vessel with 100 ml. of the alcohol mixture, with heating and stirring, to give as homogeneous a dispersion as possible. The resulting dispersion is thereafter added slowly to the vigorously stirred alkoxide solution, while the temperature is maintained at about 100° C. by heating or cooling as needed. The reaction mixture is analyzed periodically by thin-layer chromatography (TLC), and is then stirred at about 100° C. in an inert atmosphere until TLC analysis indicates that reaction has proceeded to the desired degree. The alkaline catalyst is then neutralized with a suitable acid, such as carbon dioxide or acetic acid (mineral acid may be used, if desired), and the hot liquid reaction mixture is subsequently poured into thin layers and allowed to freeze. The crude product obtained in this manner is a suspension of the desired mixed esters in the mixed alcohols, and the total sophoroside content is approximately 20–25 percent. If the sophoroside products are desired free from unreacted or excess alcohol, they can be separated by any suitable means, such as solvent-solvent partition or column chromatography on silica gel.

These two methods are then applied to the corresponding sophoroside starting materials derived from lard and commercial "pure" (97 percent min.) stearyl alcohol. Similar results are also obtained.

In the following examples, standard procedures are employed in making and evaluating the doughs and baked goods containing sophoroside esters. Several of these procedures are described in U.S. Pat. No. 3,343,964 and in publications by B. A. Brachfeld et al. in "Bakers Digest," Vol. 13, No. 1 (1968). In "Bakery Technology and Engineering" by Matz (Avi Publishing Co., 1960), loaf characteristics such as symmetry, crust color, crumb structure and color, flavor, aroma, etc., are defined. To determine specific volumes of bread after baking, the loaves are cooled at room temperature for 1 hour and then weighed to the nearest gram. The volume is measured with a Loaf-Volume Meter (National Mfg. Co.), which uses rape seed displacement, and the specific volume thereafter calculated by the formula; Sp. Vol.=Volume (in cc.)/Weight (in gm.). To determine softness retention, a Precision Penetrometer is used, as discussed in some of the above-cited publications.

EXAMPLE I

Five sophoroside esters were prepared, all in the form of freeze-dried solids, but of varying particle sizes and bulk densities. Their composition and principal physical characteristics were as follows:

| Compound | (A) | (B) | (C) | (D) | (E) |
| --- | --- | --- | --- | --- | --- |
| Substrate | Palmitate | [1] WG | WG | WG | [1] HWG |
| Ester | Propyl | Ethyl | Propyl | Butyl | Propyl |
| Free COOH meq./g. | 0.10 | 0.08 | <0.04 | 0.06 | 0.07 |
| Sapon. meq./g.[2] | 1.59 | 1.90 | 1.61 | 1.57 | 1.59 |
| Percent acetyl | 0.38 | 0.55 | 0.51 | 0.51 | |
| Percent Na [3] | 0.90 | 1.09 | 0.46 | 1.80 | |
| Surface tens.[4] | 51.1/— | —/40.7 | 47.1/41.1 | —/40.9 | 51.0/— |
| Interfacial tens.[4] | 2.9/— | —/1.5 | 9.9/0.9 | —/1.4 | 1.7/— |

[1] WG = white grease; HWG = hydrogenated white grease.
[2] Theoretical saponification values are as follows, viz., Pr Palm=1.57; Et WG=1.53; Pr WG=Pr HWG=1.50, and Bu WG=1.47, assuming that all acids in white grease sophoroside are $C_{18}$. In practice, white grease contains 20–30% $C_{16}$ acids, which could produce results slightly higher than the theoretical ones quoted in accord with the observed results.
[3] Sodium percentage is determined by atomic absorption spectrometry; the amount of salt added to the doughs via these samples is considered to be too small to affect the test results significantly.
[4] Surface tension and interfacial (benzene: $H_2O$) tension measurements are entered in the table at two different concentrations, viz., 0.001%/0.01%; the data units are in dynes/cm.

All five of the esters gave good emulsion stability results in a standard laboratory test employing cottonseed oil and water at pH 4.5 and also at pH 6.0, respectively. They also gave excellent results in a standard laboratory viscoamylograph test for determining their complexing effect on the starch contained in the flour pastes.

All five of these esters were then incorporated in yeast-leavened bread doughs and baked according to the following technique:

Control Bread Formula

| Sponge | Grams |
| --- | --- |
| Flour | 840.0 |
| Water | 460.0 |
| Yeast | 30.0 |
| Yeast Food | 6.0 |

| Dough | |
| --- | --- |
| Flour | 360.0 |
| Sucrose | 96.0 |
| Nonfat Milk Powder | 36.0 |
| Salt | 25.5 |
| Calcium Propionate | 1.5 |
| Shortening | 30.0 |
| Water | 312.0 |
| Test Additives | 6.0 |

The various candidate sophorosides were added at the dough stage, using 6 grams or 0.5 percent flour basis. Each 6-gram sample was suspended in 100 ml. of water, heated to 90° C. and cooled to room temperature before being added on the dough side. The sophoroside-water mixtures had the following appearance:

| Sample | 90° C. | After Cooling |
| --- | --- | --- |
| (A) | Clear solution—amber color | Very soft wet cream |
| (B) | Clear solution—amber color | Clear solution—amber |
| (C) | Clear solution—amber color | Hazy amber liquid |
| (D) | Clear solution—dark amber color | Clear solution dark amber |
| (E) | Clear solution—dark amber color | Very soft wet tan cream |

PREPARATION PROCEDURE

A Hobart Mixer Model C–100, equipped with a McDuffee bowl and fork, were used to mix the sponge and dough stages.

The sponges were mixed at 78° F. and allowed to ferment for 4 hours in a cabinet held at 80° F. The dough stages were brought out of the mixer at 82° F. Mixing time for the sponge was for 1 minute at No. 1 speed and for 1 minute at No. 2 speed. The dough stage was mixed for 1 minute at No. 1 speed and for 2¼ minutes at No. 2 speed.

MAKE-UP PROCEDURE

After mixing (or development), the doughs were held at room temperature for 25 minutes additional fermentation time (floor time) and then scaled into 16-ounce portions. These pieces were then "rounded" by hand. That is, rolled into tight balls, thereby eliminating large bubbles of air and $CO_2$ gas. The rounded dough balls were then "sheeted" twice through a National Manufacturing Company laboratory sheeter-moulder, using 5/16-inch setting for the first sheeting and a 3/16-inch setting for the second. The sheeted doughs were then molded on the same equipment and placed in greased bread pans.

PROOFING AND BAKING PROCEDURE

The panned loaves were proofed for 1 hour at 120° F. and 90 percent relative humidity. They were then baked at 430° F. for 23 minutes.

These bake tests were carried out over a period of 6 days, in each case using, as controls, two doughs containing the same proportion (0.5 percent by weight of flour) of sodium stearyl fumarate ("Pruv") and of a mixture consisting of 65 percent monoglycerides and 35 percent diglycerides ("Atmul 500"), respectively. The results obtained in this manner were as follows:

| Dough Formula | Grams |
| --- | --- |
| Flour | 100.0 |
| Water | 66.0 |
| Yeast | 2.5 |
| Mineral yeast food | 0.5 |
| Sugar | 8.0 |
| Nonfat milk solids | 2.0 |
| Salt | 2.3 |
| Calcium acid phosphate | 0.2 |
| Shortening (regular liquid type containing cottonseed flakes, monoglycerides and vegetable oils) | 3.25 |

The doughs were fermented after first mixing at a standard impeller speed of 195 r.p.m. for a period of 2.5 hours at 86° F., then extruded at 105° F., proofed for 50-55 minutes and finally baked for 18 minutes at 430° F. The dough strengths and bread properties of the resulting product prepared in this manner are reported below in the following table, where dough strength is determined by measuring the distance required for a pan of proofed dough to fall in order to cause rupture and crumb softness is determined by means of a Baker Compressimeter, with the values being expressed in terms of weight in grams required to compress 1 sq. in. of crumb 2.0 millimeters:

| Emulsifier | Dough shock test (in.) | Grain | Texture | Taste | Chewability | Sp. vol. | Compressibility (gms.) | | |
| --- | --- | --- | --- | --- | --- | --- | --- | --- | --- |
| | | | | | | | 1 day | 2 days | 4 days |
| Control | 0.75 | Good | Very good | Very good | Fair | 2,340 | 4.9 | 7.0 | 12.0 |
| 0.2% (D) | 1.9 | Very good | Excellent | do | Very good | 2,400 | 4.5 | 6.5 | 11.0 |
| 0.4% (D) | 2.6 | do | do | do | Excellent | 2,500 | 4.1 | 6.0 | 8.0 |
| 0.6% (D) | 2.6 | Excellent | do | do | do | 2,650 | 4.1 | 6.6 | 8.3 |
| 0.4% CSL | 1.5 | Very good | Very good | do | Good | 2,400 | 5.0 | 6.8 | 11.0 |

The dough shock tests in the above table demonstrate the very desirable increase in dough strengths obtained with these

SOFTNESS RETENTION TEST DATA

| Level, percent | Treatment | Penetrometer readings | | | | Total points | Specific volume, cc./gm. |
| --- | --- | --- | --- | --- | --- | --- | --- |
| | | Refrig., 1 day | Room temperature storage | | | | |
| | | | 3 days | 4 days | 5 days | | |
| 0.5 | Pruv control | 114 | 96 | 86 | 71 | | 6.01 |
| 0.5 | Sample (A) | 106 | 90 | 78 | 63 | -30 | 6.15 |
| 0.5 | Atmul 500 control | 95 | 83 | 68 | 55 | -66 | 6.06 |
| | | 1 day | 3 days | 4 days | 6 days | | |
| 0.5 | Pruv control | 119 | 102 | 89 | 70 | | 6.09 |
| 0.5 | Sample (B) | 103 | 92 | 79 | 52 | -54 | 6.14 |
| 0.5 | Sample (C) | 114 | 96 | 80 | 54 | -36 | 6.17 |
| 0.5 | Atmul 500 control | 96 | 86 | 70 | 41 | -87 | 6.06 |
| | | 1 day | 3 days | 5 days | 6 days | | |
| 0.5 | Pruv control | 116 | 95 | 72 | 64 | | 6.96 |
| 0.5 | Sample (D) | 111 | 93 | 61 | 54 | -28 | 6.22 |
| 0.5 | Sample (E) | 113 | 93 | 66 | 55 | -20 | 6.12 |
| 0.5 | Atmul 500 control | 97 | 80 | 53 | 47 | -70 | 6.12 |

These data show that the compounds definitely do possess bread softener activity. The relative activity is observed to increase with the chain length of the ester, while hydrogenation of the white grease is also found to enhance the activity. The sophoroside treated loaves are also found to possess slightly better specific volumes than the Pruv controls. Also, the crumb structure is definitely better than with the Atmul controls and about as good as the Pruv loaves. This clearly indicates dough conditioner activity.

EXAMPLE II

The effectiveness of the alkyl esters of the sophorosides of this invention in improving the properties of dough and bread made by the continuous mix method was demonstrated by incorporating a white grease sophoroside n-butyl ester, corresponding to compound (D) of example I, into the following standard dough formula at levels of 0 (control), 0.2, 0.4 and 0.6 percent by weight of the flour, with calcium stearyl lactylate (CSL) at 0.4 percent serving as a positive control for comparison purposes:

particular esters. The table also shows the improvement in chewability (continuous mix bread has a tendency to be tough and gummy when chewed), and in texture and grain obtained when the products of the present invention are used. Compressibility results, on the other hand, show the improved keeping qualities of the bread during the ageing process.

Lastly, a general comparison of the butyl ester at 0.2 percent with calcium stearyl lactylate (CSL), a commercially used bread additive, at 0.4 percent definitely indicates that the butyl ester has approximately twice the effectiveness of the commercial additive with respect to both bread and dough properties.

EXAMPLE III

The procedure described in the previous example is repeated using white grease sophoroside ethyl ester, corresponding to compound (B) of example I, in place of the butyl ester used before. In like manner, the technical grade stearyl ester of white grease sophoroside as well as the n-hexyl ester of palmitic acid sophoroside are also each employed at these same concentration levels in the aforesaid procedure. In each and every case, the results obtained are substantially the same as those reported for the butyl ester in example II.

EXAMPLE IV

Yellow cakes were prepared by the following recipe, which also contained white grease sophoroside n-butyl ester, i.e., compound (D) Of example I, at concentration levels of 0 (control), 1, 2, and 3 percent (by weight), based on the shortening.

In addition, cakes were also made with a mixed emulsifier consisting of 3 percent by weight of said butyl ester and 1 percent by weight of a commercial monoglyceride (viz, Durkee SGP-104, containing 40–45 percent α-monoglycerides) as well as with 6 percent of said monoglyceride used alone.

| | Grams |
|---|---|
| Flour | 100.0 |
| Shortening (unemulsified, hydrogenated vegetable type) | 50.0 |
| Sugar | 6125.0 |
| Nonfat milk solids | 10.0 |
| Salt | 4.2 |
| Eggs | 58.3 |
| Baking Powder | 5.2 |
| Water | 83.3 |

The dry ingredients, shortening and eggs were blended together at 361 r.p.m. with the aid of a Hobart Kitchenaid mixer for a period of 15 seconds. Water, containing the sophoroside butyl ester (when used), was next added to themix and agitation continued for a period of 2 minutes thereafter at 361 r.p.m. The final mixing step at 107 r.p.m. required 4 minutes. The cakes were then baked at 360° F. for 21 minutes. Batter and cake properties of the resultant product are summarized below in the following table:

| Emulsifier | Batter Properties | Cake Properties |
|---|---|---|
| 1% Sample (D) | Sp. gr. 0.85; very thick, curdy, unsatisfactory | |
| 2% Sample (D) | Sp. gr. 0.85; fair, slightly curdy, better than 1. | Fairly good |
| 3% Sample (D) | Sp. gr. 0.875; very nice batter, smooth, note curdy. | Very good cake, quite satisfactory |
| 3% (D)+1% monoglyceride | Sp. gr. 0.825; excellent batter | Best of lot, excellent |
| 6% monoglyceride | Sp. gr. 0.825; good | Good cake, but inferior to emulsifier mixture |

It can be seen from the above table that use of the sophoroside n-butyl ester emulsifier greatly improves the quality of the cakes. At the optimum level of 3 percent, with or without 1 percent monoglyceride, the cakes possess excellent grain, texture, crumb color and other internal characteristics. The use of the sophoroside ester emulsifier at 3 percent together with monoglyceride at 1 percent, in combination, affords cakes even superior to those made with the commonly used 6 percent level of monoglyceride.

EXAMPLE V

The procedure described in the previous example is repeated using white grease sophoroside ethyl ester, corresponding to compound (B) of example I, in place of the butyl ester used before. In like manner, the technical grade stearyl ester of white grease sophoroside as well as the n-hexyl ester of palmitic acid sophoroside are also each employed at these same concentration levels in the aforesaid procedure. In each and every case, the results obtained are substantially the same as those reported by the butyl ester in example IV.

EXAMPLE VI

The beneficial effects of the ethyl ester of white grease sophoroside (corresponding to compound (B) of example I) in a French-type salad dressing emulsion were observed by incorporating same into the following typical formulation at levels of 0.05 and 0.1 percent, by weight, calculated on the basis of the total weight of the emulsion, respectively:

| | Grams |
|---|---|
| Monosodium Glutamate | 1.0 |
| Sucrose | 3.0 |
| Salt | 2.5 |
| Paprika | 1.0 |
| Onion Powder | 1.4 |
| Mustard Powder | 0.4 |
| White Pepper Powder 0.4 | |
| Garlic Powder | 0.5 |
| Hydrolyzed Vegetable Protein Powder | 1.0 |
| Vinegar (White distilled, 5% Acid Strength) | 22.0 |
| Lemon Juice | 3.0 |
| Tomato Sauce | 3.0 |
| Cotton Seed Oil | 60.8 |
| Total | 100.0 |

It was found that those emulsion samples containing 0.05 and 0.1 percent by weight of the aforementioned sophoroside ethyl ester are quite stable and exhibit a considerable increase in viscosity, as compared to the controls containing no such additive. As a matter of fact, the negative control sample exhibits poor emulsion stability, with a large layer of oil separation, while its determined viscosity is found to be considerably below that of the treated samples.

EXAMPLE VII

The procedure described in the previous example was repeated except that the n-butyl ester of white grease sophoroside was incorporated at levels of 0.025 and 0.1 percent by weight into an Italian salad dressing having the following composition:

| | Grams |
|---|---|
| Vinegar (White distilled, 5% Acid Strength) | 20.0 |
| Corn Oil | 57.5 |
| Olive Oil | 10.0 |
| Onion Powder | 1.5 |
| Garlic Powder | 1.0 |
| Salt | 3.0 |
| Sugar | 3.0 |
| Chopped Dehydrated Hot Pepper | 0.5 |
| Chopped Dehydrated Green Pepper 1.5 | |
| Monosodium Glutamate | 1.5 |
| Mustard Powder | 0.4 |
| Total | 100.0 |

It was found that the results obtained in this manner, with the n-butyl ester, are substantially the same as those reported in example VI for the corresponding ethyl ester.

EXAMPLE VIII

The procedure described in example VI was followed except that the commercial stearyl ester of the sophoroside obtained from a methyl palmitate fermentation (i.e., so called "-deacetylated" sophoroside) was incorporated into a blue cheese salad dressing of the following composition at levels of 0.025 percent and salad 0.10 percent by weight, respectively:

| | Grams |
|---|---|
| Water | 6.00 |
| Vinegar (White distilled, 5% Acid Strength) | 14.80 |
| Salt | 0.75 |
| Sugar | 3.00 |
| Mustard Powder | 0.37 |
| Garlic Powder | 0.50 |
| Citric Acid | 0.10 |

Table —Continued

| | |
|---|---|
| White Pepper Powder | 0.20 |
| Majorum Powder | 0.02 |
| Coriander Powder | 0.02 |
| Celery Extract | 0.01 |
| Worcestershire Sauce | 0.03 |
| Egg Yolk (Bouten) | 4.00 |
| Sesame Oil | 65.10 |
| Grated Blue Cheese | 15.00 |
| Total | 100.00 |

It was found that the results obtained in this manner, with the stearyl ester, are also substantially the same as those reported previously in example VI for the corresponding ethyl ester.

EXAMPLE IX

The surfactant property effects of white grease sophoroside ethyl ester on the texture, amount of air beaten into the product (i.e., so-called "overrun") and taste of ice cream were observed by incorporating the sophoroside compound at levels of 0.008 and 0.025 percent, by weight, into the following three systems of ice cream mixes and comparing them to their respective negative controls:

| Ingredients | I | II | III |
|---|---|---|---|
| Sucrose | 16.00% | 16.00% | 16.00% |
| Nonfat Milk Solid | 6.00% | 6.00% | 6.00% |
| Gelatin | 0.50% | | 0.25% |
| Heavy Cream (40% Butterfat) | 40.00% | 40.00% | 40.00% |
| Pure Vanilla Extract | 0.50% | 0.50% | 0.50% |
| Water | 37.50% | 37.00% | 37.25% |
| Total | 100.00% | 100.00% | 100.00% |

It was found that in each of the above mixes the sophoroside ethyl ester at levels of 0.008 and 0.025 percent by weight, respectively, cause a dramatic increase in the whipping qualities of the product. At the same time, a smoother or more velvetlike texture was obtained along with increased chewiness sand bite-resistance, but without objectionable aftertaste. These results compare favorably with the negative control samples since the latter was found to possess a slight granular texture (i.e. sandylike) and, in addition, exhibit inferior whipping qualities together with a slight icy taste.

EXAMPLE X

The procedure described in the previous example is repeated using the n-butyl ester of the sophoroside obtained from a methyl palmitate fermentation in place of the corresponding ethyl ester used before. In like manner, the n-hexyl ester of said sophoroside is also employed at these same two concentration levels in each of the three mixes of the aforesaid procedure. In each and every case, the results obtained are still substantially the same as those reported previously by the ethyl ester in example IX.

EXAMPLE XI

The addition of white grease sophoroside ethyl ester at levels of 0.25 and 0.6 percent, by weight, to long-grain enriched rice just prior to cooking, is easily accomplished by dry-tumbling said ingredients together until no free sophoroside ester is any longer clearly visible. The finished cooked rice, when compared to a negative control containing no such ester, is observed to exhibit greatly improved grain texture (i.e., a softer and drier texture) in each instance, as clearly ascertained by the reduced stickiness and surface slime of the final product. This, in turn, causes far less agglomeration of the treated cooked rice grains, as contrasted with that of the control samples, which tend to be very sticky in nature and of a highly starchy texture.

EXAMPLE XII

Macaroni noodles are prepared by first mixing together one whole egg, ½ teaspoon of salt and 2 tablespoons of milk, followed by 1 cup of sifted all-purpose flour to produce a very thick dough. The dough mixture is then rolled very thin and allowed to stand for 20 minutes. Upon completion of this step, the dough is rolled loosely and cut into ¼-inch slices, then unrolled and allowed to dry for 2 hours at room temperature (~25° C.). The procedure is then repeated using the ethyl ester of white grease sophoroside at a concentration level of 2 percent, based on the weight of the flour, with the organic compound being added via the milk component of the mixture (after first warming the milk slightly).

Both samples are then cooked by placing 45.4 g. of each noodle sample in 576 ml. of boiling water containing 3.6 g. of salt. The noodles are cooked for 10 minutes, then drained and placed on a steam bath. The sample containing the sophoroside ester is already firmer and less sticky than the control sample. After 4 hours heating on the steam bath, the treated sample is still firmer than the control sample, less sticky and more moist looking.

When the above procedure is repeated using the corresponding n-octyl ester at 2 percent, as well as both the n-octyl and ethyl sophoroside esters at 0.2 percent by weight of the flour, the same results are still substantially obtained, i.e., after cooking and remaining on the steam bath for 4 hours, the treated macaroni samples are far superior to the controls, particular in view of their reduced stickiness, improved texture quality and greatly superior mouth-feel.

EXAMPLE XIII

The procedure described in example XII is repeated with spaghetti instead of noodles, as the alimentary paste product of choice, and substantially similar results are also obtained. In like manner, when the noodles are replaced by macaroni as the starch-based food product, the same beneficial results are again substantially obtained.

EXAMPLE XIV

A solution of 43 g. of sophoroside of n-propyl palmitate (corresponding to compound (A) of example I) in 2.6 liters of water is prepared and then blended thoroughly with 7.4 kg. of sifted Semolina flour obtained from farina, using appropriate power blending equipment. The resulting dough is then kneaded until uniform and the dough materials extruded through appropriate dyes equipped with cutter blades to obtain spaghetti noodles. The semidry pasta product obtained in this manner is then transferred to a drying chamber where the temperature is raised from about 70° to 140° F., and the starch-based food material subsequently allowed to dry for approximately 40–90 hours until the moisture content is reduced to about 10–11 percent by weight of the total product. Pasta samples prepared in this way are notable for their softness and smooth texture, together with a lack of stickiness and improved processability of the dough. Similar results are also obtained when the sophoroside ester is employed at levels as low as 18 g. per 2.6 liters of water in the aqueous phase.

In like manner, the use of the ethyl, n-propyl and n-butyl esters of white grease sophoroside, as well as the n-propyl ester of hydrogenated white grease sophoroside, corresponding respectively to compounds (B), (C), (D) and (E) of example I, also affords substantially similar results when individually substituted for the sophoroside of n-propyl palmitate as described in the above procedure.

EXAMPLE XV

One-half cup of Wheatena (trademark name of the Wheatena Corp. for a cereal derived from wheat grain), ½ teaspoon of salt and 2½ cups of cold water, containing white grease sophoroside ethyl ester at a level of 2.5 percent by weight of the dry cereal (79 g.), are blended together to form a test batch. The latter is then slowly heated to the boiling point, with stirring, and subsequently cooked at that point for a period of 7 minutes. The procedure is repeated again, only this time using a control batch wherein no sophoroside ester is present. In this way, the results obtained show that the treated cereal particles are not clumped together like the controls, but are of improved body consistency being lighter in appearance and less pasty to the taste. Furthermore, the treated cereal product failed to exhibit the formation of a tough skin on the surface, even on prolonged standing after cooking unlike the control sample, and there is no free water present in the mixture of the final product.

EXAMPLE XVI

The procedure described in the previous example is repeated except that oatmeal is the cereal of choice in place of Wheatena. Again, the procedure is repeated only this time using a farina cereal like "Cream of Wheat" (National Biscuit Co.). In both cases, the results obtained in this study are substantially the same as those reported in example XV for the use of the sophoroside ester in Wheatena.

In like manner, the use of white grease sophoroside ethyl ester in this particular procedure at levels are low as 0.2 percent and as high as 2 percent, by weight of the dry cereal, also results in substantially the same beneficial effects as reported at 0.5 percent. The corresponding n-octyl ester also affords comparable results at these same levels of concentration.

EXAMPLE XVII

White grease sophoroside ethyl ester, corresponding to Compound (B) of example I, is incorporated into pregelatinized corn starch and food-grade corn starch, respectively, at levels of both 0.4 and 1 percent by weight of said particular starch. The resultant mixture, in each instance, is then used in one of the following pudding formulations as indicated below:

|  | Instant Pudding Base Mix (grams) | Cooked Pudding Base Mix (grams) |
|---|---|---|
| Pregelatinized corn starch | 20.00 | — |
| Pure food-grade corn starch | — | 14.17 |
| Cerelose | 5.89 | 14.00 |
| Sucrose | 24.00 | 28.00 |
| Monosodium Phosphate | 0.10 | — |
| Disodium Phosphate | 0.10 | — |
| Salt | 0.81 | 0.71 |
| Imitation Vanilla Powder Flavor, 20-fold | 0.05 | 0.06 |
| Pure Vanilla Extract, One-Fold | 0.05 | 0.06 |
| Total | 51.00 | 57.00 |

The instant pudding base mix (51 g.), prepared as described above, is weighted into a bowl, followed by the addition of 240 g. of fluid milk. Using a laboratory kitchen Sunbeam Mixmaster, the contents of the bowl are then mixed at No. 2 speed (low speed) for a period of 5 minutes (i.e., until the pudding mix is properly hydrated). The resultant pudding, obtained in this manner, is finally refrigerated at 40° F. for a period of 8 hours.

The cooked pudding base mix (57 g.), on the other hand, is stirred with 237 g. of fluid milk in a saucepan to form a blend. The stirred contents are then cooked, using the No. 4 heat-surface unit control of an electric range, for a period of 10 minutes (i.e., until the mixture comes to a full boil). The cooked puddings are subsequently allowed to stand at room temperature (~25° C.) for 15 minutes before being refrigerated at 40° F. for a period of 8 hours.

The overall procedure is then repeated once again using no additive in the corn starch (control samples) and in this way, it is noted that the addition of 0.4 and 1 percent of the sophoroside ethyl ester to the starch component of both the instant pudding and cooked pudding mixes results in a definite improvement of the texture and mouth-feel of the final food products. For instance, at these two concentration levels, the treated samples are judged to possess a creamy and glossy texture with soft skin formation; whereas the negative control (or untreated) samples both show an inferior and dull texture, together with tough skin formation as well as a pronounced starchy effect with respect to taste or mouth-feel.

In like manner, the use of the other alkyl sophoroside esters corresponding respectively to compounds (A), (C), (D) and (E) of example I also affords substantially similar results when individually substituted for the ethyl ester of white grease sophoroside at the same concentration levels in the instant and cooked vanilla pudding mixes of the above procedure.

EXAMPLE XVIII

White grease sophoroside ethyl ester, corresponding to compound (B) of example I, is incorporated into a custard pudding mix of the following composition in the manner hereinafter indicated below:

| Mix No. 1 | Grams |
|---|---|
| Sugar | 45.5 |
| Salt | 1.4 |
| Milk Powder | 24.0 |
| Water at 20° C. | 136.5 |

The above dry ingredients are dissolved in the water, and the resultant aqueous solution stirred well and brought to a boil with the aid of gentle heating.

| Mix No. 2 | Grams |
|---|---|
| Sophoroside Ester | 0.25 |
| Water at 20° C. | 45.5 |
| Corn Starch | 20.5 |
| Whole Eggs (beaten) | 40.0 |

The sophoroside ester is dissolved in the water, followed by the addition of corn starch to the resultant aqueous solution. The mixture is then stirred and the eggs are added at this point, with continued stirring of the mixture. A small portion of hot Mix No. 1, prepared as described above, is then added and the resultant mixture is stirred well, followed by the addition of the remaining portion of said aqueous mix with constant agitation of the mixture also being maintained throughout this step. The resultant system is then brought to a boil, with the aid of gentle heating, and 18 g. of butter and 1 g. of vanilla extract are introduced into the hot mix, which is then allowed to simmer for 5 minutes. At this point, the heat source is removed from the system and the finished custard pudding is subsequently chilled.

The custard pudding obtained in this manner is observed to have a softer skin and better texture than a control sample containing no sophoroside ester. The treated pudding also possesses an improved mouth-feel, as compared to the control sample. Similar results are obtained when white grease sophoroside ethyl ester is employed at a level of 0.1 g. in previously described Mix No. 2.

In like manner, the use of the sophoroside of ethyl palmitate (preparation A) as well as the n-butyl ester of white grease sophoroside, corresponding to compound (D) of example I, also affords substantially similar results when said esters are each individually substituted for the ethyl ester of white grease sophoroside in this same procedure at levels of 2.5 and 1.5 percent by weight of the corn starch (in Mix No. 2).

EXAMPLE XIX

A baker's cake shortening as employed in example IV is prepared by incorporating into the warm liquid lard, with the aid of vigorous stirring, 0.5–3 percent by weight (based on the shortening) of palmitic sophoroside stearyl ester (prepared according to preparation C, using commercial stearyl alcohol), followed by cooling. The use of this particular shortening agent in the bake method of example IV then results in the production of excellent cakes, without the necessity of requiring the separate addition of food emulsifier at other points in the preparative procedure. Similar results are also obtained when the n-hexyl ester of white grease sophoroside is incorporated into the lard at the same concentration levels in place of the stearyl ester.

EXAMPLE XX

A 1,000 g. quantity of peeled potato tubers are sliced into approximately ¾-inch slices and cooked for 30 minutes in steam at 99° C. The cooked slices are then cooled and frozen until solid, followed by a slow thawing period to prevent rupture of the cell. Excess water present is thereafter removed by centrifugal force, and the slices are then granulated by paddling through a screen. The granules obtained in this manner are next treated with white grease sophoroside ethyl ester [corresponding to compound (B) of example I] at levels of 0.25 percent and 0.6 percent, by weight, respectively, based on the weight of the dry solids present in the mixture. Further drying of the resultant mixture is accomplished by means of a rotary drier and the dry potato granules, so obtained, are then used by blending same into the following composition in the manner indicated below:

|  | Grams |
| --- | --- |
| Potato granules (dry) | 50.00 |
| Butter | 6.00 |
| Salt | 1.75 |
| Milk | 20.00 |
| Water (boiling) | 187.00 |

The above instant potato granules are first creamed with the butter, salt and milk, followed by the addition of the boiling water. The mixture is whipped in a bowl, using a Sunbeam Mix-Master, until a smooth and creamy mashed potato product is obtained (this step requires approximately 8 minutes). The final finished food product obtained in this manner possesses a light, fluffy texture, as compared to the control sample lacking the sophoroside ester as a food additive.

EXAMPLE XXI

Snack chips are prepared by incorporating sophoroside white grease n-butyl ester [corresponding to compound (D) of example I] into a food mixture of the following composition in the manner indicated below:

|  | Grams |
| --- | --- |
| Bread flour | 150.00 |
| Corn meal, yellow | 150.00 |
| Salt (table) | 7.50 |
| Cooking oil | 3.75 |
| Sophoroside Ester | 2.00 |
| Water | 135.00 |

Dough is prepared, sheeted, cut into strips and fried in deep fat to a golden brown (this required a period of 2 minutes at 375° F.). The chips obtained in this manner are of improved friability and crunchiness, as compared to the controls lacking this ester. Further, the untreated chips are observed to be rather hard and vitreous, and possess poor eating qualities, unlike the finished product obtained above. As a matter of fact, substantially similar beneficial effects are even observed with levels as low as 0.2 g. of the n-butyl sophoroside ester in the food mix of the above procedure.

In like manner, the use of the other alkyl sophoroside esters corresponding respectively to compounds (A), (B), (C) and (E) of example I also affords substantially similar results when individually substituted for the n-butyl ester of white grease sophoroside in the food mix described above for this same procedure.

EXAMPLE XXII

To prepare an improved margarine product, 500 g. of skimmed milk are first treated with 0.87 g. of citric acid. The resulting solution is then further treated with 47.5 g. of a commercial starter culture and subsequently incubated at 20°-25° C. for a period of 16-18 hours until a pH of approximately 4.3 is thus obtained. This mixture is called a "ripened milk phase."

A fat blend is next prepared by warming together 425 g. of cottonseed oil and 475 g. of hydrogenated cottonseed oil (m.p. 34° C.). The hot blend obtained in this manner is then successively treated at 40° C. with 0.03 g. of diacetyl, 0.05 g. each of oil-soluble food dyes F.D. and C. Nos. 3 and 4, 0.06 g. of vitamin A palmitate and 0.23 g. of butylated hydroxy toluene (BHT).

The ripened milk phase (211 g.), prepared as described above, is now treated with 0.75-3.0 g. of the n-propyl sophoroside ester of hydrogenated white grease [compound (E) of example I] and mixed with the above fat phase, together with 32 g. of table salt. The resultant mixture is stirred while cooling to −7° C. and the temperature is thereafter allowed to rise to 25°-26° C. The prepared margarine is subsequently removed from the vessel, molded and stored for 24 hours at 40° F., followed by packaging for ultimate consumer use.

EXAMPLE XXIII

Peanut butter is prepared by first grinding roasted peanuts together to form a paste and then thoroughly blending the latter material with 0.5 percent by weight of the sophoroside ester of n-propyl palmitate [corresponding to compound (A) of example I]. The resulting product is then salted to taste. In this way, it is observed that the treated product has a much smoother consistency and less tendency to oil separation than the untreated control sample, which contains no sophoroside ester. Substantially similar results are also obtained using the other alkyl sophoroside esters of example I, corresponding respectively to compounds (B), (C), (D) and (E), at levels falling in the 0.05-0.75 percent concentration range.

EXAMPLE XXIV

Whipped toppings are prepared by incorporating white grease sophoroside ethyl ester, as emulsifier, into the following composition in the manner hereinafter indicated below:

|  | Grams |
| --- | --- |
| Hydrogenated Coconut Oil | 32.00 |
| Corn Syrup Solids (Dextrose Equiv.42) | 4.00 |
| Sodium Caseinate | 3.00 |
| Sucrose | 8.00 |
| Carboxymethylcellulose | 0.10 |
| Vanilla Extract | 0.25 |
| Sodium Citrate | 0.05 |
| Water, distilled | 52.50 |
| Sophoroside Ester | 0.10 |
| Total | 100.00 |

All the dry solid ingredients are first blended together, followed by the addition of water to dissolve the same. The coconut fat is then melted (m.p. 98° C.) and added to the aqueous solution, which is subsequently pasteurized at 74° C. for 30 minutes. The vanilla flavor is added at this point and the resulting mixture is thoroughly homogenized, and then cooled at 40° F. and aged for 12 hours prior to whipping. The whipped toppings obtained in this manner are found to be of improved texture and quality, in addition to possessing superior mouth-feel, as compared to the controls samples lacking the sophoroside ester as emulsifier. Similar results are obtained when the white grease sophoroside ester is employed at a level of 0.025 g. (at the expense of the water) per 100 g. of total composition.

In like manner, the use n-butyl, n-hexyl and mixed stearyl sophoroside esters obtained from fermentation with methyl palmitate also affords substantially similar results when each of said esters is individually substituted for the ethyl ester of white grease sophoroside as used in the above procedure.

EXAMPLE XXV

A baker's specialty shortening, especially useful in icings and toppings, is obtained by the use of the sophoroside esters of this invention in combination with mono- and diglycerides in the manner as is hereinafter described. For instance, to a warmed liquid form of hydrogenated vegetable shortening containing monoglyceride at a level of approximately 2.5 percent by weight of alpha monoglyceride, there is added sufficient white grease sophoroside ethyl ester with vigorous stirring to afford levels in the 0.03–0.2 percent concentration range. After cooling to room temperature, the shortening obtained in this manner is then used as described in example XXIV to afford the preparation of icings and whipped toppings having improved volume and texture, and yet without the necessity of having to add the sophoroside ester at different points in the preparative procedure.

In like manner, the use of isopropyl and n-butyl esters of both white grease and palmitic sophoroside in the shortenings of the above procedure also affords substantially similar results in each case.

EXAMPLE XXVI

A spray-dried coffee whitener, which disperses readily in hot coffee to give a stable dispersion having good mouth-feel and taste properties, is prepared in the following manner using the ingredients listed below:

|  | Grams |
| --- | --- |
| Hydrogenated Coconut Oil | 35–40 |
| Corn Syrup Solids (Dextrose Equiv.,42) | 55–60 |
| Sodium Caseinate | 4.5–5.5 |
| Dipotassium Phosphate | 1.2–1.8 |
| Stearyl Palmitic Sophoroside | 0.1–0.3 |
| Ethyl White Grease Sophoroside | 0.02–0.1 |
| Mannitol | q.s. 100 g. |

An emulsion is first prepared (containing 50–60 percent solids) by blending the above ingredients together in the usual manner. After homogenization is complete, the emulsion is spray-dried to a moisture content not exceeding 1 percent. When the above procedure is repeated omitting the sophoroside esters, the food product obtained in the processing is observed to give a poor dispersion and to possess unpleasant (i.e., greasy) mouth-feel and taste properties.

EXAMPLE XXVII

Baker's marshmallows are prepared by incorporating 2.5–5.0 g. of the n-butyl ester of white grease sophoroside, corresponding to compound (D) of example I, into a mixture of 15 g. of water and 15 g. of confectionary sugar. The resulting mixture is then beaten to a stiff foam. This foam is subsequently treated with a solution consisting of 2.0 g. of 250-bloom gelatin dissolved in 6 g. of water, followed by stirring. The resultant mixture is then treated with a hot solution prepared from 192 g. of confectionary sugar, 46 g. of water and 240 g. of corn syrup. The final formulation is whipped for 10–15 minutes in order to prepare the marshmallow material for extrusion in the normal manner to give the desired final product. Marshmallows prepared in this way are found to be smoother, softer and more consistent, in addition to being more readily processable, than control materials which lack the sophoroside ester.

EXAMPLE XXVIII

A chocolate coating composition is obtained by first milling together 11.5 g. of cocoa powder and 54 g. of confectionary sugar. The resultant powder is then passed through a 40-mesh screen and added slowly to a melted mixture (at 55°–60° C.), consisting of 34 g. of coconut fat containing 0.2 g. of vanillin flavoring and 0.05–3.0 g. of the ethyl ester of white grease sophoroside dissolved in 1.0 g. of whole milk. The resulting mixture is blended carefully at 55°–60° C. and then milled in a Waring blender. The final mixture is subsequently transferred to a mold and allowed to solidify in the usual manner. The chocolate coating sample obtained in this way is noted to be smoother in texture and less grainy and harder, than an untreated control sample lacking the sophoroside ester. Similarly favorable results are obtained using n-hexyl palmitic sophoroside in place of the aforementioned ethyl ester.

EXAMPLE XXIX

The procedure described in example I is repeated using a mixed stearyl ester of a palmitic sophoroside corresponding to the compound of method I in preparation E. The results obtained in this manner are substantially the same as those reported in the first example for the corresponding propyl ester, as regards both dough improvement and bread softening effects.

EXAMPLE XXX

The procedure described in example I is repeated using sophoroside ester concentration levels as low as 0.01 percent by weight of the flour and as high as 3 percent by weight of same. In both instances, bread softening and dough improvement effects are observed.

EXAMPLE XXXI

The procedure described in example I is repeated using the ethyl ester of white grease sophoroside [compound (B) of said example] in combination with the propyl ester of hydrogenated white grease sophoroside [compound (E) of said example] on a 50:50 parts by weight basis. The procedure is also repeated using the n-butyl ester of white grease sophoroside (D) in place of the corresponding ethyl ester in said combination. In both instances, the results obtained are substantially the same as those reported in the first example for the use of either component alone at the same concentration level. Similar results are also obtained with the aforesaid combinations using levels as low as 0.01 percent and as high as 3 percent, both based on the weight of the flour.

EXAMPLE XXXII

The procedure described in example I is repeated using a mixed stearyl ester of a palmitic sophoroside, corresponding to the compound of method I in preparation E, in combination with the corresponding ethyl ester of preparation A on a 75:25 parts by weight basis. Again the results obtained in this manner are substantially the same as those reported previously in the first example for the propyl palmitate sophoroside ester when used alone. Similar results are also obtained with the aforesaid combination at levels as low as 0.01 percent and as high as 3 percent, both being based on the weight of the flour.

What is claimed is:

1. A prepared food product selected from the group consisting of starch-based foods and animal or vegetable fat emulsion-based foods having incorporated therein between about 0.01 and about 3 percent by weight, on an as-consumed basis, of at least one sophoroside of an alkyl ester of a substantially $C_{16}$ to $C_{18}$ fatty acid having a single hydroxy group on either the omega carbon or the carbon adjacent thereto, said alkyl substituent containing from two to about 18 carbons.

2. A product as claimed in claim 1 wherein the alkyl substituent of the sophoroside ester is ethyl.

3. A product as claimed in claim 1 wherein the alkyl substituent of the sophoroside ester is butyl.

4. A product as claimed in claim 1 wherein the prepared food is a starch-based food.

5. A prepared food consisting of an animal or vegetable fat emulsion-based food having incorporated therein between about 0.01 and about 3 percent by weight, on an as-consumed basis, of at least one sophoroside of an alkyl ester of a substantially $C_{16}$ to $C_{18}$ fatty acid having a single hydroxy group on either the omega carbon or the carbon adjacent thereto, said alkyl substituent containing from two to about 18 carbons.

6. A leavened bakery product having incorporated therein between about 0.01 and about 3 percent by weight, on an as-consumed basis, of at least one sophoroside of an alkyl ester of a substantially $C_{16}$ to $C_{18}$ fatty acid having a single hydroxy group on either the omega carbon or the carbon adjacent thereto, said alkyl substituent containing from two to about 18 carbons.

7. A starch-based food consisting of pasta having incorporated therein between about 0.01 and about 3 percent by weight, on an as-consumed basis, of at least one sophoroside of an alkyl ester of a substantially $C_{16}$ to $C_{18}$ fatty acid having a single hydroxy group on either the omega carbon or the carbon adjacent thereto, said alkyl substituent containing from two to about 18 carbons.

8. A breakfast cereal having incorporated therein between about 0.01 and about 3 percent by weight, on an as-consumed basis, of at least one sophoroside of an alkyl ester of a substantially $C_{16}$ to $C_{18}$ fatty acid having a single hydroxy group on either the omega carbon or the carbon adjacent thereto, said alkyl substituent containing from two to about 18 carbons.

9. A shortening having incorporated therein between about 0.01 and about 3 percent by weight, on an as-consumed basis, of at least one sophoroside of an alkyl ester of a substantially $C_{16}$ to $C_{18}$ fatty acid having a single hydroxy group on either the omega carbon or the carbon adjacent thereto, said alkyl substituent containing from two to about 18 carbons.

10. A salad dressing having incorporated therein between about 0.01 and about 3 percent by weight, on an as-consumed basis, of at least one sophoroside of an alkyl ester of a substantially $C_{16}$ to $C_{18}$ fatty acid having a single hydroxy group on either the omega carbon or the carbon adjacent thereto, said alkyl substituent containing from two to about 18 carbons.

11. An ice cream having incorporated therein between about 0.01 and about 3 percent by weight, on an as-consumed basis, of at least one sophoroside of an alkyl ester of a substantially $C_{16}$ to $C_{18}$ fatty acid having a single hydroxy group on either the omega carbon or the carbon adjacent thereto, said alkyl substituent containing from two to 18 carbons.

* * * * *